(12) United States Patent
Kim

(10) Patent No.: US 12,179,546 B2
(45) Date of Patent: Dec. 31, 2024

(54) SUSPENSION FOR VEHICLES

(71) Applicants: Hyundai Motor Company, Seoul (KR); Kia Corporation, Seoul (KR)

(72) Inventor: Jae Hun Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/384,032

(22) Filed: Oct. 26, 2023

(65) Prior Publication Data

US 2024/0383291 A1 Nov. 21, 2024

(30) Foreign Application Priority Data

May 17, 2023 (KR) .................. 10-2023-0063815

(51) Int. Cl.
*B60G 7/00* (2006.01)
*B60G 3/04* (2006.01)
*B60G 13/00* (2006.01)

(52) U.S. Cl.
CPC .............. *B60G 7/001* (2013.01); *B60G 3/04* (2013.01); *B60G 13/00* (2013.01)

(58) Field of Classification Search
CPC ...... B60G 2202/22; B60G 7/001; B60G 3/04; B60G 13/00; B60G 2204/419; B60G 3/225; B60G 2200/1324; F16F 2232/04; F16D 2125/20; F16D 2125/40
See application file for complete search history.

(56) References Cited

U.S. PATENT DOCUMENTS

| 11,718,134 B1 * | 8/2023 | Ishibashi | B60G 11/182 |
| | | | 280/124.167 |
| 2008/0277894 A1* | 11/2008 | Runkel | B60G 17/00 |
| | | | 280/124.128 |
| 2021/0164532 A1* | 6/2021 | Talon | F16F 13/007 |

FOREIGN PATENT DOCUMENTS

| EP | 0010019 A1 * | 4/1980 | .......... B60G 17/033 |
| JP | 04031113 A * | 2/1992 | ......... B60G 2202/40 |
| KR | 10-2008-0036793 | 4/2008 | |
| KR | 20090062651 A * | 6/2009 | ......... B60G 21/0558 |

* cited by examiner

*Primary Examiner* — Paul N Dickson
*Assistant Examiner* — Matthew D Lee
(74) *Attorney, Agent, or Firm* — Morgan, Lewis & Bockius LLP

(57) ABSTRACT

A suspension for vehicles includes a suspension arm and a shock absorbing module integrally connected, wherein the shock absorbing module is disposed in the front and rear direction of a vehicle to absorb shocks and vibrations of the vehicle through translational motion in the front and rear direction thereof. The suspension for vehicles can significantly lower the vehicle height, enabling the implementation of an ultra-low-floor platform, and may be applied to vehicles that require securing loading space.

18 Claims, 7 Drawing Sheets

SUSPENSION FOR VEHICLES

CROSS REFERENCE TO RELATED APPLICATIONS

The present application claims priority to Korean Patent Application No. 10-2023-0063815, filed May 17, 2023, the entire contents of which is incorporated herein for all purposes by this reference.

BACKGROUND OF THE PRESENT DISCLOSURE

Field of the Present Disclosure

The present disclosure relates to suspension for vehicles, and more particularly, to suspension for vehicles that converts the rotation motion of a suspension arm into translational motion of the shock absorbing module to absorb shocks applied to the suspension arm.

Description of Related Art

Car suspension is a device that connects an axle to a vehicle body so that vibrations or impacts from the road surface when a vehicle is running are not transferred directly to the vehicle body, preventing damage to the vehicle body or cargo and improving ride comfort.

A typical suspension system is configured to support the weight of the vehicle body with the stiffness of springs and alleviate the vertical vibration of wheels.

The conventional suspension system needs to be connected to the vehicle body to configure a strut or shock absorber that operates in the vertical direction, and includes a disadvantage in that the overall vehicle height inevitably increases as a top mount of the strut or shock absorber is raised to satisfy the wheel stroke.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing suspension for vehicles in which a shock absorbing module connecting a suspension arm and a vehicle body converts the rotation motion of the suspension arm into translational motion to absorb shocks, and that can compensate for the disadvantages of the high vehicle height by being able to lower the height, and that can dramatically free vehicle package space while maintaining the vertical vibration absorption performance of an existing suspension system.

An objective of the present disclosure is to provide suspension for vehicles that enables implementation of ultra-low-floor platforms, rolling chassis, and skateboard-type chassis platforms required to secure loading space in purpose built vehicles (PBV), electric vehicles, and mobilities.

To achieve the objectives of the present disclosure, there is provided suspension for vehicles including: a suspension arm connected to a wheel of the vehicle; a damper housing connected to a vehicle body; a shock absorbing module connecting the suspension arm and the damper housing and configured to convert rotation motion of the suspension arm into translational motion of the shock absorbing module to absorb shocks applied to the suspension arm.

The shock absorbing module may be disposed in a front and rear direction of a vehicle to perform the translational motion in the front and rear direction of the vehicle when the suspension arm rotates.

The shock absorbing module may include: a damper engaged to the suspension arm and configured to receive the rotation motion of the suspension arm and convert the rotation motion of the suspension arm into a translational motion of the damper in a front and rear direction of a vehicle; and a damper spring connected to the damper and configured to generate a damping force while being compressed by the translational motion of the damper.

The shock absorbing module may further include: a damper gear mounted in the damper housing, connected to the suspension arm, and configured to rotate together with the suspension arm in response that the suspension arm rotates; a ball screw gear mounted in the damper housing and configured to rotate in gear-engagement with the damper gear; a ball screw including an end portion thereof connected to the ball screw gear and rotating together with the ball screw gear; and a ball nut coupled to the ball screw to move along the ball screw when the ball screw rotates, and connected to the damper to translate the damper.

An external ring of an arm bearing may be fixedly coupled to each of a front surface and a rear surface of the damper housing, and the suspension arm and the damper gear may be coupled with an internal ring of the arm bearing so that when the suspension arm rotates, the internal ring of the arm bearing and the damper gear may rotate with respect to the external ring of the arm bearing.

A bush may be coupled to each of a front surface and a rear surface of the damper housing, and the suspension arm and the damper gear may be connected through the bush.

The damper gear may include a diameter greater than the ball screw gear, so that when the damper gear rotates one turn, the ball screw gear may rotate more than one turn.

One or more ball screws may be provided parallel to the damper.

Each end portion of the ball screw may be rotatably coupled to each of a front surface and a rear surface of the damper housing by a support bearing.

The suspension for vehicles may further include: a damper rod connected concentrically with the damper gear to rotate together with the damper gear, wherein the damper may perform the translational motion along the damper rod.

The suspension for vehicles may further include: a bump stopper coupled to the damper rod to limit a translational stroke of the damper.

The suspension for vehicles may further include: a damper bearing include a center portion thereof penetrated by the damper rod, and in which an end portion of the damper spring is supported by the damper bearing to prevent rotation of the damper spring while the damper rod rotates.

The damper and the ball screw may be spaced apart in a left and right direction of the vehicle and are placed in parallel.

The ball screw and the damper may be spaced apart in a vertical direction of the vehicle and are placed in parallel.

An actuator configured for length change in the front and rear direction of the vehicle may be connected to a connection portion between the damper and the ball nut, wherein by operation of the actuator, rotation of the ball screw; the ball screw gear, the damper gear, and the suspension arm may be induced, wherein due to the rotation of the suspension arm, vehicle height may be adjusted.

The suspension arm connected to the shock absorbing module may be a double-wishbone type upper arm or a lower arm.

Suspension for vehicles according to an exemplary embodiment of the present disclosure includes a configuration in which a suspension arm and a shock absorbing module are integrally connected, and the shock absorbing module is disposed in the front and rear direction of a vehicle to absorb shocks and vibrations of the vehicle through translational motion in the front and rear direction, can significantly lower the vehicle height compared to an existing suspension system to compensate for the disadvantages of the high vehicle height, and can dramatically free vehicle package space while maintaining the vertical vibration absorption performance of the existing suspension system.

Furthermore, the suspension for vehicles according to an exemplary embodiment of the present disclosure can implement ultra-low-floor platforms, rolling chassis, and skateboard-type chassis platforms, etc. required to secure loading space in purpose built vehicles (PBV), electric vehicles, and mobilities.

Furthermore, in the suspension for vehicles according to an exemplary embodiment of the present disclosure, because the suspension arm and the shock absorbing module are designed as an integrated module, a high degree of design freedom in position selection may be ensured, and thus, it is advantageous to platform sharing for small mobilities.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
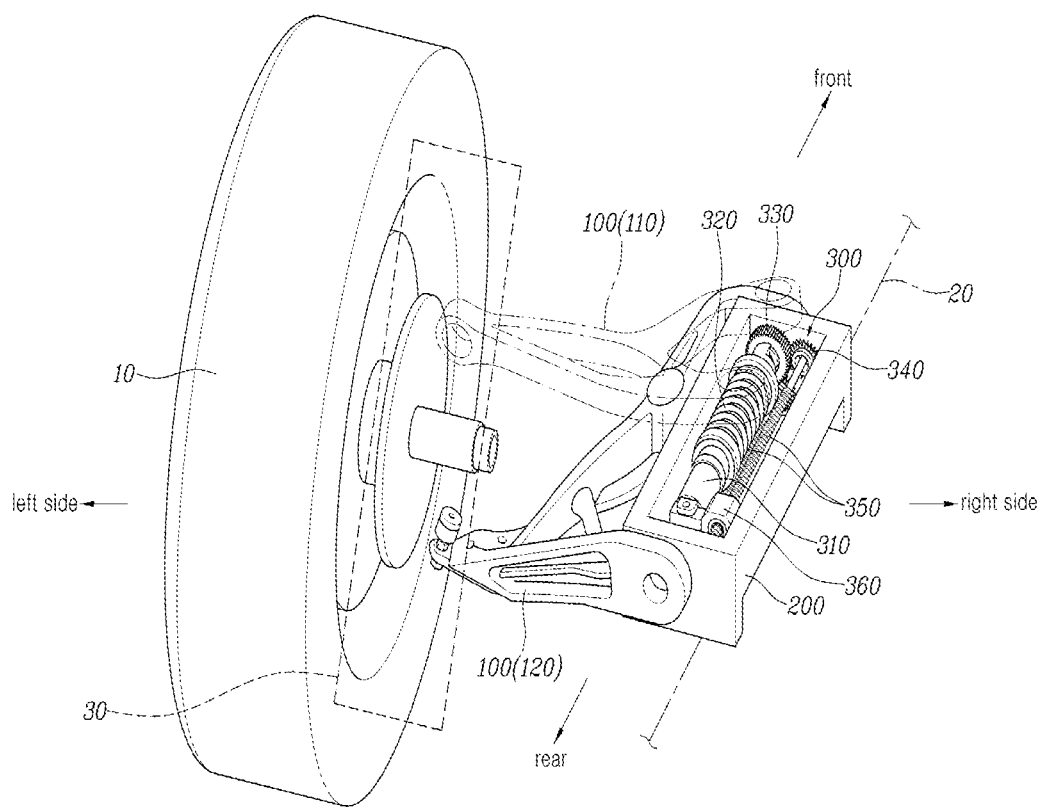
FIG. 1 is a perspective view of a suspension arm-integrated suspension for vehicles according to an exemplary embodiment of the present disclosure.
Figure 2:
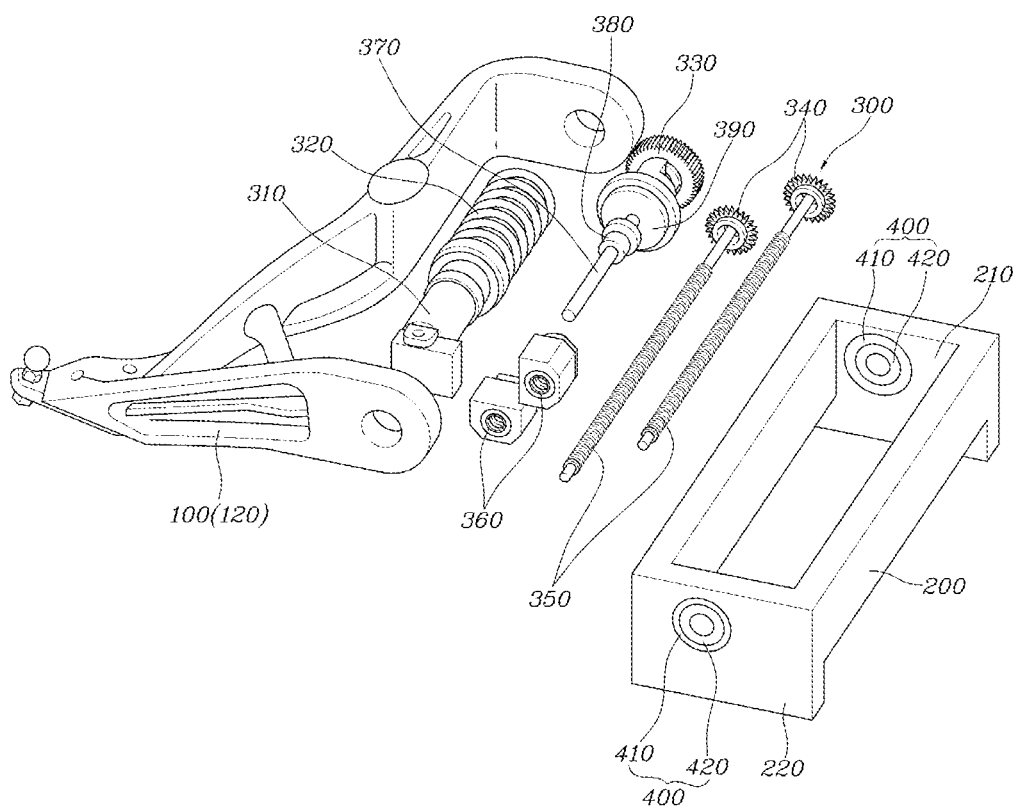
FIG. 2 is an exploded view of the suspension for vehicles according to an exemplary embodiment of the present disclosure.
Figure 3:
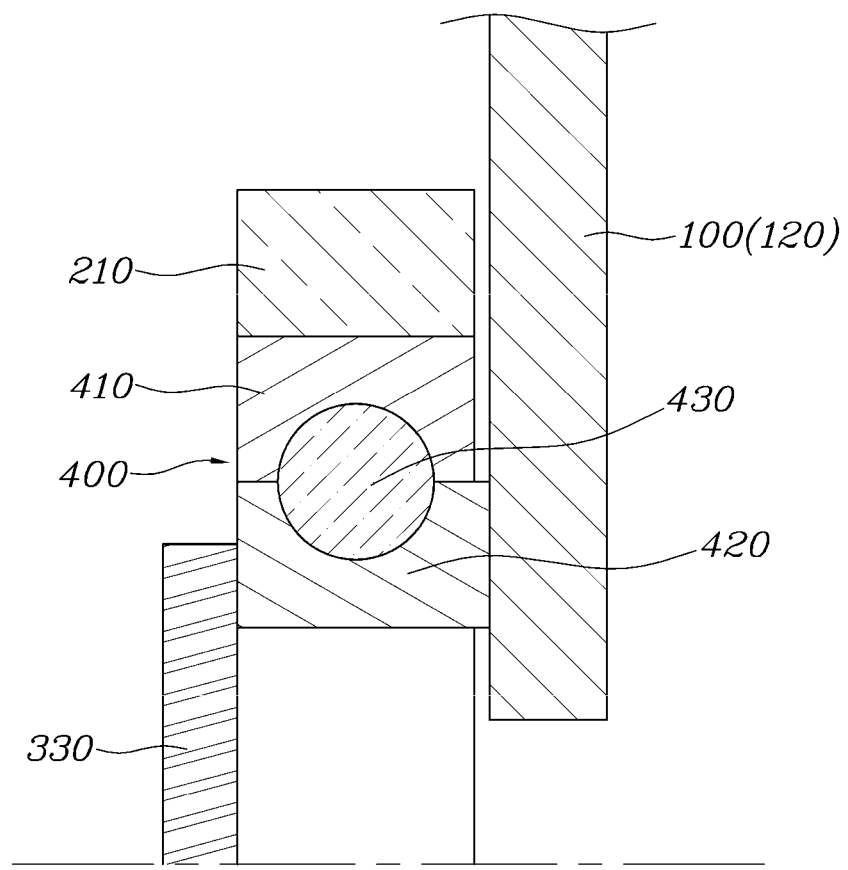
FIG. 3 is a view showing the structure of an arm bearing according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereafter, various embodiments of the present disclosure will be described in detail with reference to the accompanying drawings and the same or similar components are provided the same reference numerals regardless of the numbers of figures and are not repeatedly described.

Terms "module" and "unit (part/portion)" that are used for components in the following description are used only for the convenience of description without including discriminate meanings or functions.

In the following description, if it is decided that the detailed description of known technologies related to the present disclosure makes the subject matter of the exemplary embodiments described herein unclear, the detailed description is omitted.

Furthermore, the accompanying drawings are provided only for easy understanding of embodiments included in the specification, and the technical spirit included in the specification is not limited by the accompanying drawings, and all changes, equivalents, and replacements should be understood as being included in the spirit and scope of the present disclosure.

Terms including ordinal numbers such as "first", "second", etc. may be used to describe various components, but the components are not to be construed as being limited to the terms. The terms are used only to distinguish one component from another component.

It is to be understood that when one element is referred to as being "connected to" or "coupled to" another element, it may be directly connected to or directly coupled to another element or be connected to or coupled to another element, including the other element intervening therebetween.

On the other hand, it should be understood that when one element is referred to as being "directly connected to" or "directly coupled to" another element, it may be connected to or coupled to another element without the other element intervening therebetween.

Singular forms are intended to include plural forms unless the context clearly indicates otherwise.

It will be further understood that the terms "comprise" or "have" used in the present specification, specify the presence of stated features, steps, operations, components, parts, or a combination thereof, but do not preclude the presence or addition of one or more other features, numerals, steps, operations, components, parts, or a combination thereof.

Furthermore, the terms "unit" or "control unit" included in motor control unit (MCU), hybrid control unit (HCU), etc. are just widely used terms for naming controllers that control specific vehicle functions, and do not mean generic function units.

A controller may include a communication device that communicates with another controller or a sensor to control corresponding functions, a memory that stores an operating system or logic commands and input/output information, and one or more processors that perform determination, calculation, decision, etc. for controlling the corresponding functions.

Suspension for vehicles according to exemplary embodiments of the present disclosure will be described hereafter with reference to the accompanying drawings.

As shown in FIGS. 1 to 7, the suspension for vehicles according to an exemplary embodiment of the present disclosure includes: a suspension arm 100 connected to a wheel 10; a damper housing 200 connected to a vehicle body 20; a shock absorbing module 300 that connects the suspension arm 100 and the damper housing 200 and converts the rotation motion of the suspension arm 100 into translational motion of the shock absorbing module to absorb shocks applied to the suspension arm.

As an exemplary embodiment of the present disclosure, a knuckle 30 is coupled to the wheel 10, and one end portion of the suspension arm 100 is rotatably coupled to the knuckle 30.

The vehicle body 20 may be a member or sub-frame of a vehicle located on the side of the suspension arm 100, and the damper housing 200 is coupled to the vehicle body 20.

The damper housing 200 is formed in a rectangular frame structure, and a relatively long side thereof is disposed to extend in the front and rear direction of the vehicle.

The shock absorbing module 300 is disposed to be located within the damper housing 200, and due to the provided configuration, there is an advantage in that the external size of the shock absorbing module 300 may be configured compactly.

According to an exemplary embodiment of the present disclosure, the suspension arm 100 connected to the shock absorbing module 300 may be either a double-wishbone type upper arm 110 or lower arm 120.

In an exemplary embodiment of the present disclosure, a suspension arm-integrated suspension system in which the double-wishbone type lower arm 120 and the shock absorbing module 300 are integrally connected will be described as an exemplary embodiment of the present disclosure.

The shock absorbing module 300 according to an exemplary embodiment of the present disclosure is disposed in the front and rear direction of the vehicle within the damper housing 200, and includes a structure that absorbs shocks while performing translational motion in the front and rear direction of the vehicle when the suspension arm 100 rotates.

The shock absorbing module 300 includes: a damper 310 that receives the rotation motion of the suspension arm 100 and translates in the front and rear direction of the vehicle; and a damper spring 320 which is connected to the damper 310 and generates a damping force while being compressed by the translational motion of the damper 310.

The damper 310 may include a shock absorber, and the damper spring 320 may include a compression coil spring.

The shock absorbing module 300 according to an exemplary embodiment of the present disclosure may further include a damper gear 330 connected to the suspension arm 100 and rotating together when the suspension arm 100 rotates; a ball screw gear 340 that rotates in gear-engagement with the damper gear 330; a ball screw 350 including one end portion thereof connected to the ball screw gear 340 and rotating together with the ball screw gear 340; and a ball nut 360 which is coupled to the ball screw 350 to move along the ball screw 350 when the ball screw 350 rotates, and connected to the damper 310 to translate the damper 310.

In the exemplary embodiment of the present disclosure, an external ring 410 of an arm bearing 400 is fixedly coupled to a front surface 210 and a rear surface 220 of the damper housing 200, and the suspension arm 100 and the damper gear 330 are coupled with an internal ring 420 of the arm bearing 400, so that when the suspension arm 100 rotates, the internal ring 420 of the arm bearing 400 and the damper gear 330 rotate with respect to the external ring 410 of the arm bearing 400.

The arm bearing 400 includes: the external ring 410 and the internal ring 420; and a plurality of balls 430 disposed between the external ring 410 and the internal ring 420.

The external ring 410 is press-fitted and fixed to the front surface 210 and the rear surface 220 of the damper housing 200, and the internal ring 420 rotates relative to the external ring 410 by the plurality of balls 430.

The internal ring 420 of the arm bearing 400 located on the front surface 210 of the damper housing 200 is combined with the suspension arm 100 and the damper gear 330, and thus, when the suspension arm 100 rotates, the internal ring 420 of the arm bearing 400 and the damper gear 330 of rotate with respect to the external ring 410 of the arm bearing 400 and the damper housing 200.

The arm bearing 400 is configured to fix the damper housing 200 and the suspension arm 100 and support rotation of the suspension arm 100.

Figure 4:
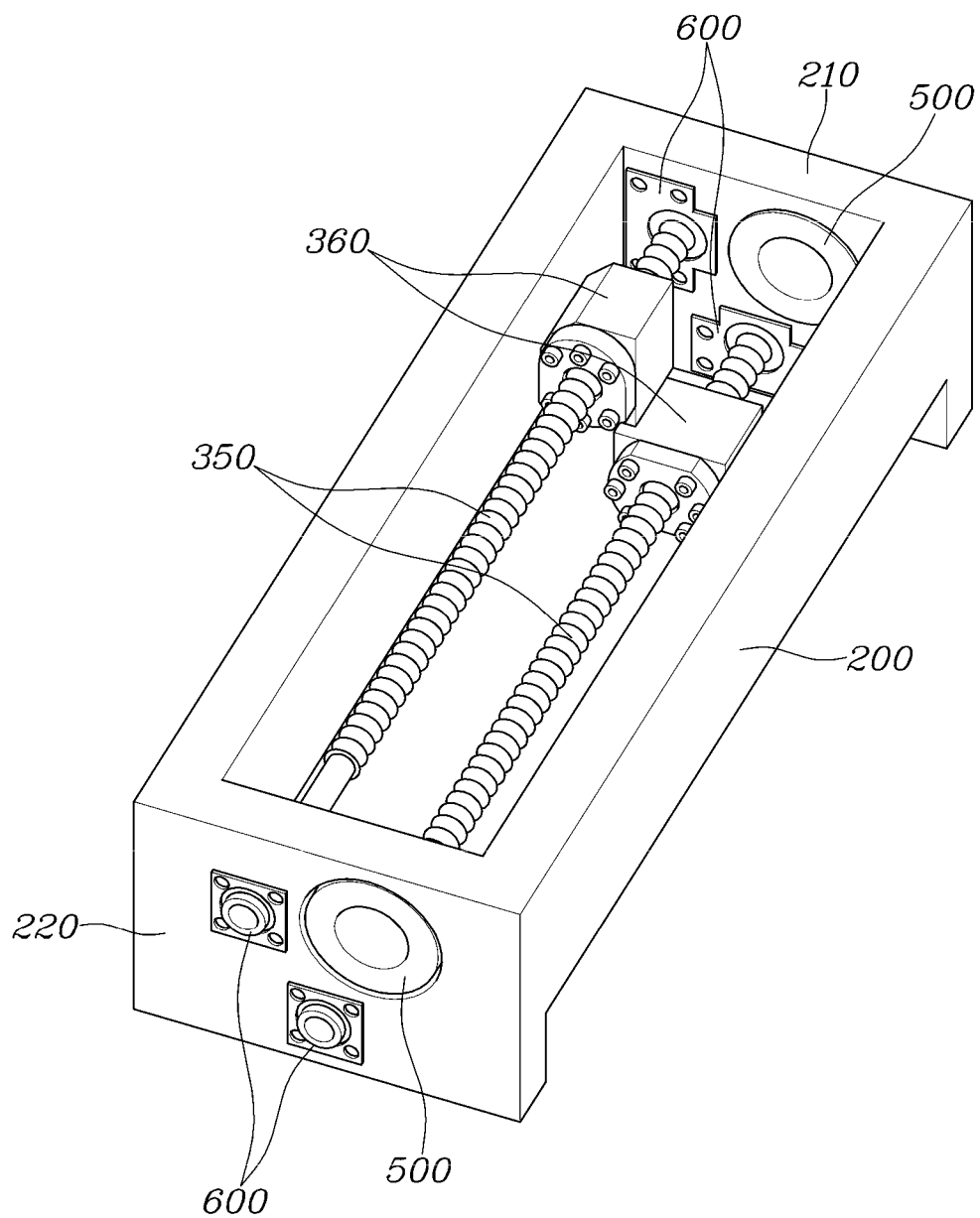
FIG. 4 is a view showing a structure in which a bush is coupled to a damper housing according to an exemplary embodiment of the present disclosure.

In the exemplary embodiment of the present disclosure, as shown in FIG. 4, a bush 500 may be coupled to the front surface 210 and the rear surface 220 of the damper housing 200, and the suspension arm 100 and the damper gear 330 may be connected through the bushes 500.

The bush 500 made of steel or plastic may be coupled to the front surface 210 and the rear surface 20 of the damper housing 200 instead of the arm bearing 400, and when the bush 500 is applied, it is advantageous to ensure ride comfort and handling performance compared to a configuration in which the arm bearing 400 is applied.

The damper gear 330 according to an exemplary embodiment of the present disclosure includes a diameter greater than the ball screw gear 340, so that when the damper gear 330 rotates one turn, the ball screw gear 340 rotates more than one turn. Due to the provided configuration, when the suspension arm 100 rotates, the damper 310 and the damper spring 320 operate rapidly to speed up the responsiveness of the shock absorbing performance.

The damper gear 330 and the ball screw gear 340 are externally meshed with each other.

To satisfy the operating stroke of the damper 310, the gear ratio between the damper gear 330 and the ball screw gear 340 and the pitch of the ball screw 350 may be set as design factors, and due to the provided configuration, it is possible to optimize the damping force and spring stiffness according to the operating lever ratio.

In an exemplary embodiment of the present disclosure, one or more ball screws 350 may be provided and arranged in parallel with the damper 310.

One ball nut 360 is coupled to one ball screw 350, and typically one to three ball screws 350 are arranged in parallel to each other. Furthermore, the plurality of ball nuts 360 are configured to be connected to each other to be integrated and move simultaneously.

It is possible to optimize the quantity and axis arrangement of the ball screw 350 and the ball nut 360 according to vehicle resources, and due to the provided configuration, optimization of operating efficiency according to vehicle load may be realized on the same platform.

When a lead screw is used instead of the ball screw 350, efficiency is reduced and noise is generated due to friction. To prevent this, it would be more desirable to apply the ball screw 350 instead of the lead screw.

For smooth rotation of the ball screw 350 relative to the damper housing 200, both end portions of the ball screw 350 may be rotatably coupled to the front surface 210 and the rear surface 220 of the damper housing 200 by a support bearing 600.

The shock absorbing module 300 according to an exemplary embodiment of the present disclosure may further include a damper rod 370 connected concentrically with the damper gear 330 to rotate together with the damper gear 330.

One end portion of the damper rod 370 is connected to the center portion of the damper gear 330 while the other end portion of the damper rod 370 extends in the longitudinal direction of the damper 310 and is inserted into the damper 310. Accordingly, the damper 310 is configured to perform translational motion along the damper rod 370.

The shock absorbing module 300 according to an exemplary embodiment of the present disclosure may further include a bump stopper 380 coupled to the damper rod 370 to limit the translational stroke of the damper 310.

The bump stopper 380 is made of rubber to absorb shock and prevent noise when in contact with the damper 310 moving in translation, but is not limited thereto.

The shock absorbing module 300 according to an exemplary embodiment of the present disclosure may further include a damper bearing 390 including the center portion thereof penetrated by the damper rod 370, and in which one end portion of the damper spring 320 is supported to prevent the rotation of the damper spring 320 when the damper rod 370 rotates.

The damper bearing 390 is rotatably coupled to the damper rod 370, and one end portion of the damper spring 320 is supported on one side of the damper bearing 390.

Thus, even when the damper gear 330 and the damper rod 370 rotate, the damper bearing 390 does not rotate, and the damper spring 320 supported by the damper bearing 390 is also prevented from rotating, enabling the smooth translational motion of the damper 310. Furthermore, smooth compression of the damper spring 320 is possible, resulting in sufficient shock-absorbing performance and damping performance.

Figure 5:
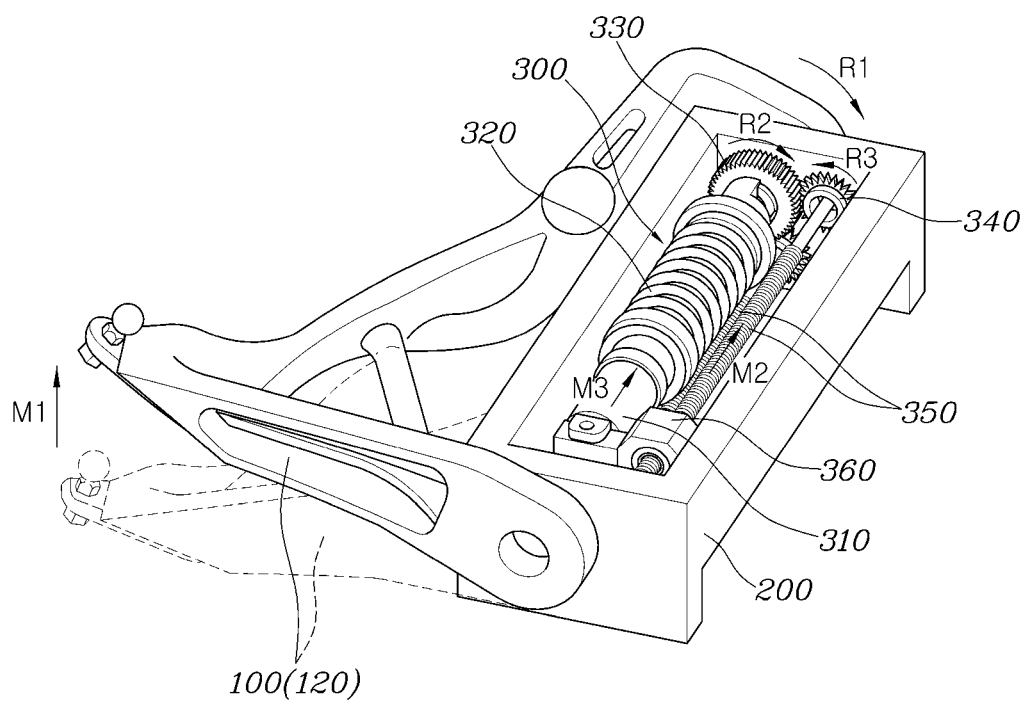
FIG. 5 is a view showing the operation of the suspension for vehicles according to an exemplary embodiment of the present disclosure.

FIG. 5 is a view showing the operation of the suspension for vehicles according to an exemplary embodiment of the present disclosure.

When the wheel 10 is bumped and the suspension arm 100 rotates as the wheel center portion moves upward as shown by arrow M1 (arrow R1), the damper gear 330 rotates clockwise (arrow R2), the ball screw gear 340 and the ball screws 350 rotate counterclockwise (arrow R3), the ball nut 360 moves toward the ball screw gear 340 along the ball screw 350 (arrow M2), and by the movement of the ball nut 360, the damper 310 and the damper spring 320 are compressed by translational motion of the ball nut 360 in the direction of arrow M3, exhibiting shock absorption and damping performance.

In the exemplary embodiment of the present disclosure, as shown in FIGS. 1 and 5, the damper 310 and the ball screw 350 may be provided in a structure arranged in parallel while being spaced apart in the left and right direction of the vehicle.

When the package space in the vertical direction of the vehicle is compact, the damper 310 and the ball screw 350 are spaced apart in the left and right direction of the vehicle to provide an optimal arrangement structure, and due to the provided configuration, freedom of design for layout structure may be increased.

Figure 6:
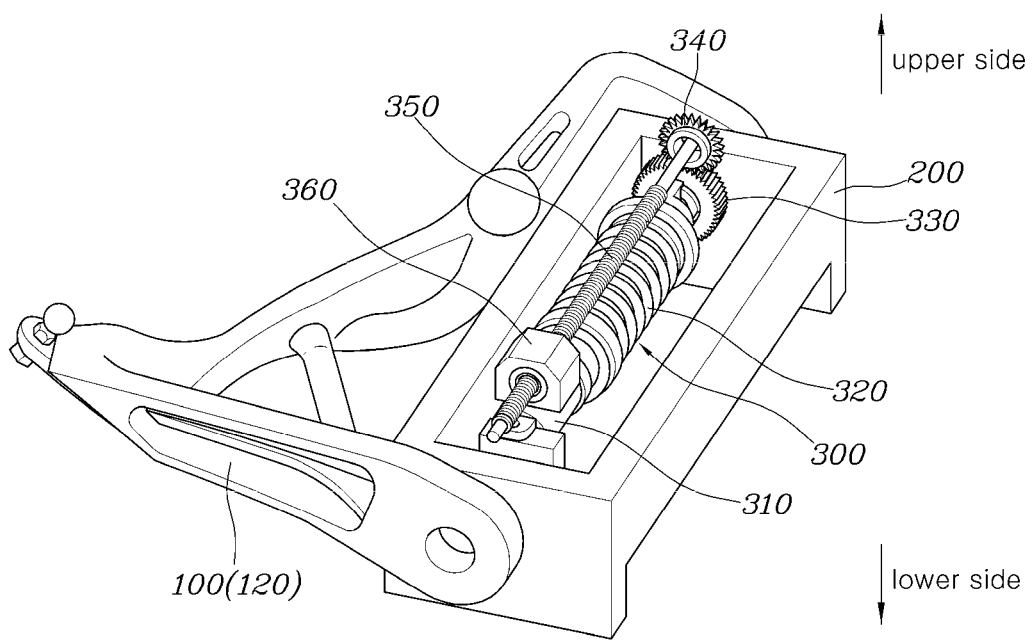
FIG. 6 is a view showing a structure in which a ball screw and the damper are vertically disposed according to an exemplary embodiment of the present disclosure.

As an exemplary embodiment of the present disclosure, the ball screw 350 and the damper 310 may be spaced apart in the vertical direction of the vehicle and disposed in parallel as shown in FIG. 6.

When the package space in the left and right direction of the vehicle is compact, the ball screw 350 and the damper 310 are spaced apart in the vertical direction of the vehicle to provide an optimal arrangement structure, and due to the provided configuration, freedom of design for layout structure may be increased.

Figure 7:
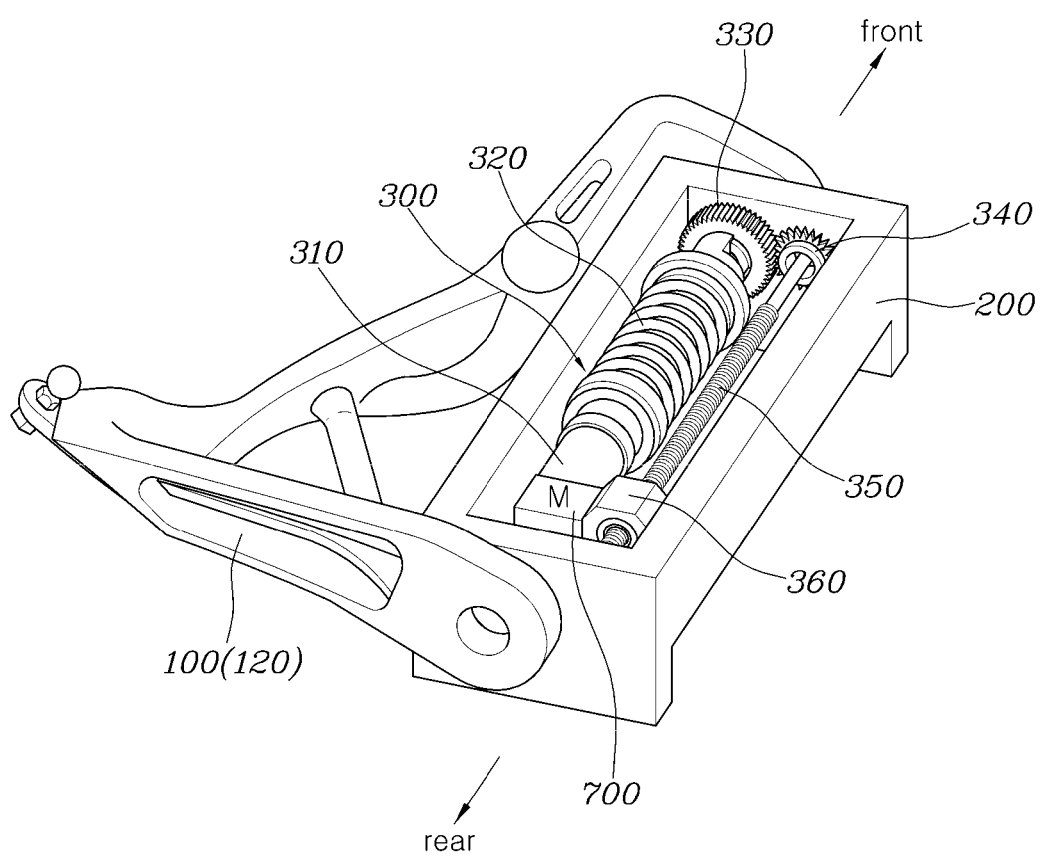
FIG. 7 is a view showing a structure in which an actuator is connected to a connection portion between the damper and a ball nut according to an exemplary embodiment of the present disclosure.

In the exemplary embodiment of the present disclosure, as shown in FIG. 7, an actuator 700 configured for length change in the front and rear direction of the vehicle may be provided and connected to a connection portion between the damper 310 and the ball nut 360. The actuator 700 may be a motor. By operating the actuator 700 connected to the damper gear 330 through the damper 310, the rotation of the ball screw 350, the ball screw gear 340 connected to the ball screw 350, the damper gear 330 in gear-engagement with the bass screw gear 340, and the suspension arm 100 connected to the damper gear 330 may be induced, and due to the rotation of the suspension arm 100, it is possible to adjust the vehicle height.

As described above, the suspension for vehicles according to an exemplary embodiment of the present disclosure includes a configuration in which the suspension arm 100 and the shock absorbing module 300 are integrally connected, and the shock absorbing module 300 is disposed in the front and rear direction of a vehicle to absorb shock and vibration of the vehicle through translational motion in the front and rear direction, can significantly lower the vehicle height compared to an existing suspension system, and can compensate for the disadvantages of the high vehicle height, and can dramatically free the vehicle package space while maintaining the vertical vibration absorption performance of the existing suspension system.

Furthermore, the suspension for vehicles according to an exemplary embodiment of the present disclosure can implement ultra-low-floor platforms, rolling chassis, and skateboard-type chassis platforms, etc. required to secure loading space in purpose built vehicles (PBV), electric vehicles, and mobilities.

Furthermore, in the suspension for vehicles according to an exemplary embodiment of the present disclosure, because the suspension arm 100 and the shock absorbing module 300 are designed as an integrated module, a high degree of design freedom in position selection may be ensured, and thus, it is advantageous to platform sharing for small mobilities.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the present specification, a singular expression includes the plural form unless the context clearly dictates otherwise.

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A suspension apparatus for a vehicle, the apparatus comprising:
   a suspension arm connected to a wheel of the vehicle;
   a damper housing connected to a vehicle body;
   a shock absorbing module connecting the suspension arm and the damper housing and configured to convert rotation motion of the suspension arm into translational motion of the shock absorbing module to absorb shocks applied to the suspension arm,
   wherein the shock absorbing module includes:
      a damper gear mounted in the damper housing, connected to the suspension arm, and configured to rotate together with the suspension arm in response that the suspension arm rotates; and
      a ball screw gear mounted in the damper housing and configured to rotate in gear-engagement with the damper gear.

2. The suspension apparatus of claim 1, wherein the shock absorbing module is disposed in a front and rear direction of the vehicle to perform the translational motion in the front and rear direction of the vehicle in response that the suspension arm rotates.

3. The suspension apparatus of claim 1, wherein the shock absorbing module further includes:
   a damper engaged to the suspension arm and configured to receive the rotation motion of the suspension arm and convert the rotation motion of the suspension arm into a translational motion of the damper in a front and rear direction of the vehicle; and
   a damper spring connected to the damper and configured to generate a damping force while being compressed by the translational motion of the damper.

4. The suspension apparatus of claim 3, wherein the shock absorbing module further includes:
   a ball screw including an end portion thereof connected to the ball screw gear and rotating together with the ball screw gear; and
   a ball nut coupled to the ball screw to move along the ball screw in response that the ball screw rotates, and connected to the damper to translate the damper.

5. The suspension apparatus of claim 4, wherein an external ring of an arm bearing is fixedly coupled to each of a front surface and a rear surface of the damper housing, and the suspension arm and the damper gear are coupled with an internal ring of the arm bearing so that in response that the suspension arm rotates, the internal ring of the arm bearing and the damper gear rotate with respect to the external ring of the arm bearing.

6. The suspension apparatus of claim 4, wherein a bush is coupled to each of a front surface and a rear surface of the damper housing, and the suspension arm and the damper gear are connected through the bush.

7. The suspension apparatus of claim 4, wherein the damper gear has a diameter greater than a diameter of the ball screw gear, so that the ball screw gear rotates more than one turn in response that the damper gear rotates one turn.

8. The suspension apparatus of claim 4, wherein one or more ball screws are provided parallel to the damper.

9. The suspension apparatus of claim 8,
   wherein one or more ball screw gears are provided on the one or more ball screws and gear-engaged to the damper gear, and
   wherein one or more ball nuts are connected to each other and engaged on the one or more ball screws.

10. The suspension apparatus of claim 4, wherein a first end portion and a second end portion of the ball screw is rotatably coupled to a front surface and a rear surface of the damper housing, respectively, by a support bearing.

11. The suspension apparatus of claim 4, further including:
   a damper rod connected with the damper gear to rotate together with the damper gear,
   wherein the damper is configured to perform the translational motion along the damper rod.

12. The suspension apparatus of claim 11, further including:
   a bump stopper connected to the damper rod to limit a translational stroke of the damper.

13. The suspension apparatus of claim 11, further including:
   a damper bearing including a center portion thereof penetrated by the damper rod,
   wherein an end portion of the damper spring is supported by the damper bearing to prevent rotation of the damper spring while the damper rod rotates.

14. The suspension apparatus of claim 11,
   wherein a damper bearing is rotatably mounted on the damper rod, and
   wherein an end portion of the damper spring is supported by the damper bearing to prevent rotation of the damper spring while the damper rod rotates.

15. The suspension apparatus of claim 4, wherein the damper and the ball screw are spaced apart in a left and right direction of the vehicle and are placed in parallel.

16. The suspension apparatus of claim 4, wherein the ball screw and the damper are spaced apart in a vertical direction of the vehicle and are placed in parallel.

17. The suspension apparatus of claim 4, further including:
- an actuator connected to a connection portion between the damper and the ball nut and configured for length change in the front and rear direction of the vehicle,
- wherein by operation of the actuator, rotation of the ball screw, the ball screw gear, the damper gear, and the suspension arm is induced, and due to the rotation of the suspension arm, vehicle height is adjusted.

18. The suspension apparatus of claim 1, wherein the suspension arm connected to the shock absorbing module is a double-wishbone type upper arm or a lower arm.

* * * * *